United States Patent Office 2,867,642
Patented Jan. 6, 1959

2,867,642

DIVINYLTIN OXIDE AND METHOD OF PREPARATION

Hugh E. Ramsden, Scotch Plains, and Sanders D. Rosenberg, North Plainfield, N. J., assignors to Metal & Thermit Corporation, Rahway, N. J., a corporation of New Jersey No Drawing. Application September 18, 1956
Serial No. 610,665

6 Claims. (Cl. 260—429.7)

The present invention relates to a novel compound, divinyltin oxide, and to the preparation therof.

It is an object of the present invention to provide a novel organotin compound, divinyltin oxide.

Another object of the invention is to provide a process for preparing divinyltin oxide.

Other objects and advantages will become apparent from the following description.

Generally speaking, the present invention contemplates the preparation of divinyltin oxide by reacting divinyltin dichloride or divinyltin dibromide with a basic compound in an aqueous solution, in accordance for the following equations:

(1) 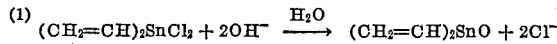
(2) 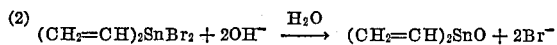

The aqueous solution must contain sufficient hydroxide ions to replace all the halogen with oxygen. To obtain good yields an excess of hydroxide ions should be present.

The bases that are utilized must ionize in an aqueous solution, and include sodium hydroxide, sodium carbonate, sodium bicarbonate, potassium hydroxide, potassium carbonate, potassium bicarbonate, ammonium hydroxide, aniline, pyridine, morpholine, tetraallkyl-ammonium hydroxides, calcium oxide and hydroxide, barium hydroxide, etc.

The divinyltin dihalide may be mixed with the aqueous solution in the pure form, or it may be in solution with an inert hydrocarbon solvent such as benzene, toluene, xylene, light petroleum fractions such as pentane, hexane, heptane, or cyclohexane, or other solutions such as alcohols, ethers, etc. which will not react irreversibly with the divinyltin dihalide, or cause the vinyl groups to self-react, e. g., cleave, rearrange or polymerize. The reaction is preferably carried out by slowly adding the divinyltin dihalide (alone or in solution, per the preceding sentence) to the aqueous basic solution, with good agitation. The temperatures employed may be as low as —5 or —10° C. and as high as the reflux temperature of the reaction mixture, preferably a maximum temperature will be maintained at not more than about 150° C. An inert atmosphere, preferably a nitrogen atmosphere which is more economical, is preferred during the reaction, although it is not necessary.

Divinyltin oxide is a solid material. As tin does not form double bonds with oxygen, it is believed that divinyltin oxide is a polymeric material composed of a series of

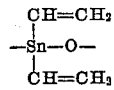

units. The end units of the polymers are probably hydroxyl units.

The following example is further illustrative of the present invention. It is to be understood, however, that the invention is not restricted to the specific embodiments described herein in detail.

Example 1.—Divinyltin oxide

In a 500 milliliter flask was placed 40 grams (1 mole) of sodium hydroxide and 300 milliliters of water. One hundred grams (0.411 mole) of divinyltin dichloride was then added, dropwise, with good stirring. The temperature rose from 30° C. to 65° C. After addition, the mix was stirred for one hour and filtered.

The crude oxide was digested on a steam bath for one hour with 500 milliliters of water to remove residual chloride. It was filtered hot, air dried, and then vacuum dried over potassium hydroxide-sodium hydroxide pellets for 18 hours in a desiccator. The yield of divinyltin oxide was 32.5 grams, and had the following analysis:

Analysis.—Calcd. for $C_4H_6OSn$: Sn, 62.95. Found: Sn, 60.60; Cl, 0.67.

Similarly, divinyltin oxide is prepared by hydrolysis of divinyltin bromide in an aqueous solution.

Although alkyl and aryl tin compounds have been known for many years and have found many and substantial uses in industry, it has not heretofore been possible to utilize them in polymerization reactions as a component of the vinyl polymer. Divinyltin oxide will copolymerize with other monomers containing unsaturated linkages, such as vinyl, chloride, styrene, vinyl silanes, methyl methacrylate, acrylates, etc. The copolymers thus produced are novel.

In addition to the outstanding utility of divinyltin oxide as a monomer utilized in the preparation of copolymers, divinyltin oxide has other unique uses. It functions as an anthelmintic when incorporated in chicken feeds or medicines. It is also useful as a stabilizer for polyvinyl chloride and as an intermediate for the preparation of other organotin compounds which function as polyvinyl chloride stabilizers. Thus, one or both of the unsaturated linkages in divinyltin oxide may be epoxidized to yield the epoxyethyl tin oxides which function as polyvinyl chloride resin stabilizers.

While the invention has been described with particular reference to specific embodiments, it is to be understood that it is not limited thereto but is to be construed broadly and restricted solely by the scope of the appended claims.

What is claimed is:

1. Divinyltin oxide.
2. A process for preparing divinyltin oxide comprising hydrolyzing a compound selected from the class consisting of divinyltin chloride and divinyltin bromide.
3. A process for preparing divinyltin oxide comprising reacting a halide selected from the class consisting of divinyltin dichloride and divinyltin dibromide with a basic aqueous solution to yield divinyltin oxide.
4. The process as described in claim 3, in which the vinyltin oxide is recovered from the aqueous solution.
5. The process as described in claim 3, in which the halide is divinyltin dichloride.
6. The process for preparing divinyltin oxide comprising reacting a halide selected from the class consisting of divinyltin dibromide and divinyltin dichloride with a basic substance in an aqueous solution.

References Cited in the file of this patent

UNITED STATES PATENTS

| | | |
|---|---|---|
| 2,683,705 | Anspon et al. | July 13, 1954 |
| 2,731,484 | Best et al. | Jan. 17, 1956 |